May 20, 1958 G. A. WULFING 2,835,881

MAGNETIC BI-STABLE DEVICE

Filed Dec. 14, 1953

INVENTOR.
GEORGE A. WULFING

BY S.C. Yuter

ATTORNEY.

2,835,881
Patented May 20, 1958

2,835,881

MAGNETIC BI-STABLE DEVICE

George A. Wulfing, Bay Shore, N. Y., assignor to Underwood Corporation, New York, N. Y., a corporation of Delaware Application December 14, 1953, Serial No. 397,940
10 Claims. (Cl. 340—174)

This invention relates to bi-stable circuits, and more particularly to magnetic-element systems having two stable states.

In the early history of bi-stable devices, two-position relays were used as bi-stable devices to respond to signals and represent, by one position or the other, one of two stable states. Relays, however, have generally been replaced as bi-stable devices by electronic circuits which respond more rapidly to the signals which control the change of state. These circuits, also known as flip-flops, generally contain amplifying vacuum tubes regeneratively interconnected in a manner such that only one tube can conduct at a given time. The conduction by a particular tube is representative of a given stable state which is more particularly indicated by a variation of voltage at an output terminal of the circuit. A similar type of flip-flop has two output terminals whose potential conditions interchange to indicate a change in the stable state of the circuit.

The use of electronic circuits as flip-flops affords many definite advantages. These circuits, however, also have a number of disadvantages such as vacuum tube failures, the changing of electrical characteristics of the components, the requirement of power supplies for the vacuum tubes, the dissipation of heat, and the inability to maintain a stable state in the event of a power failure.

To eliminate the foregoing disadvantages, systems have been developed which employ magnetic cores having rectangular hysteresis-loop properties. Cores having these properties are capable of being rapidly switched from one of their two possible directions of magnetization to the other by associated electrical windings. The cores are further capable of remaining in their last assumed magnetic state because of their high degree of retentivity of magnetization.

The ability of these magnetic cores to remain magnetized in a particular direction is, however, not directly used in signal-producing circuits to indicate a stable state because, as is fundamental in signal-producing magnetic devices, an electrical signal can only result when a change in degree or direction of magnetization occurs with respect to an associated electrical winding. Additional windings are therefore provided on these magnetic cores to respond to changes in magnetization.

It is accordingly an object of this invention to provide an improved magnetic bi-stable device.

Another object of this invention is to minimize the number of components necessary to provide a magnetic bi-stable circuit.

A further object of this invention is to provide bi-stable circuits of low cost.

Briefly, one embodiment of the invention comprises first and second magnetic cores which have rectangular hysteresis-loop properties. Each of these cores has a number of electrical windings. The first core functions as a part of a "magnetic buffer" and the second core is part of a "magnetic inhibitory gate." Each core is periodically magnetized in a given direction by a series of timing pulses which maintain the circuit in an "unexcited" state. The circuit is brought to its "excited" state by the introduction of an input or set pulse which operates to switch the direction of magnetization in the first core. The second core is connected to the magnetic buffer so that when a timing pulse restores the original direction of magnetization to the first core, the direction of magnetization in the second core is switched. The magnetic inhibitory gate functions as the stable-state indicator for the circuit and, when a timing pulse restores the normal direction of magnetization in the second core, produces an output signal which is transmitted from an associated output terminal. The output signal is also fed back to the magnetic buffer in order to provide a regenerative switching operation which endures until an inhibiting or reset signal is introduced into the circuit to terminate the operation.

Thus, the portion of the circuit described above characteristically has two mutually-exclusive stable states. One stable state is evidenced by the generation of a series of output pulses which is continued during the time interval elapsing between associated set and reset pulses. The other stable state is indicated by the absence of output pulses.

An additional magnetic core which is a part of a second inhibitory gate is coupled to the first magnetic inhibitory gate. This core, however, is not included in the feedback path. The second inhibitory gate functions as an additional stable-state indicator and provides a series of pulses only when the first inhibitory gate does not. Thus the second inhibitory gate provides an indication which is inverse to that of the first inhibitory gate.

Therefore, the invention provides a bi-stable magnetic device having two stable-state indicators whose indications are interchanged to denote changes in stable states. The magnetic flip-flop remains in one stable state until the receipt of a first signal whereupon the second stable state is assumed. The first stable state is resumed upon the receipt of a second signal.

The additional stable-state indicator is one of the features of this invention.

The invention possesses all of the advantages inherent in magnetic core devices such as reliability, stability, and high efficiency. Additionally, the invention permits important reductions in initial and maintenance costs as a result of the simplicity of construction. A further important advantage of the invention is that it eliminates many heat dissipation problems thereby allowing accompanying improvements in associated equipment. A still further advantage is the ability of the invention to retain its status despite power failure.

Other objects, features, and advantages of the invention will be pointed out in the following description and claims and illustrated in the accompanying drawings, which disclose, by way of example, the principle of the invention and the best mode which has been contemplated of applying that principle.

Figures 1, 2, 3:
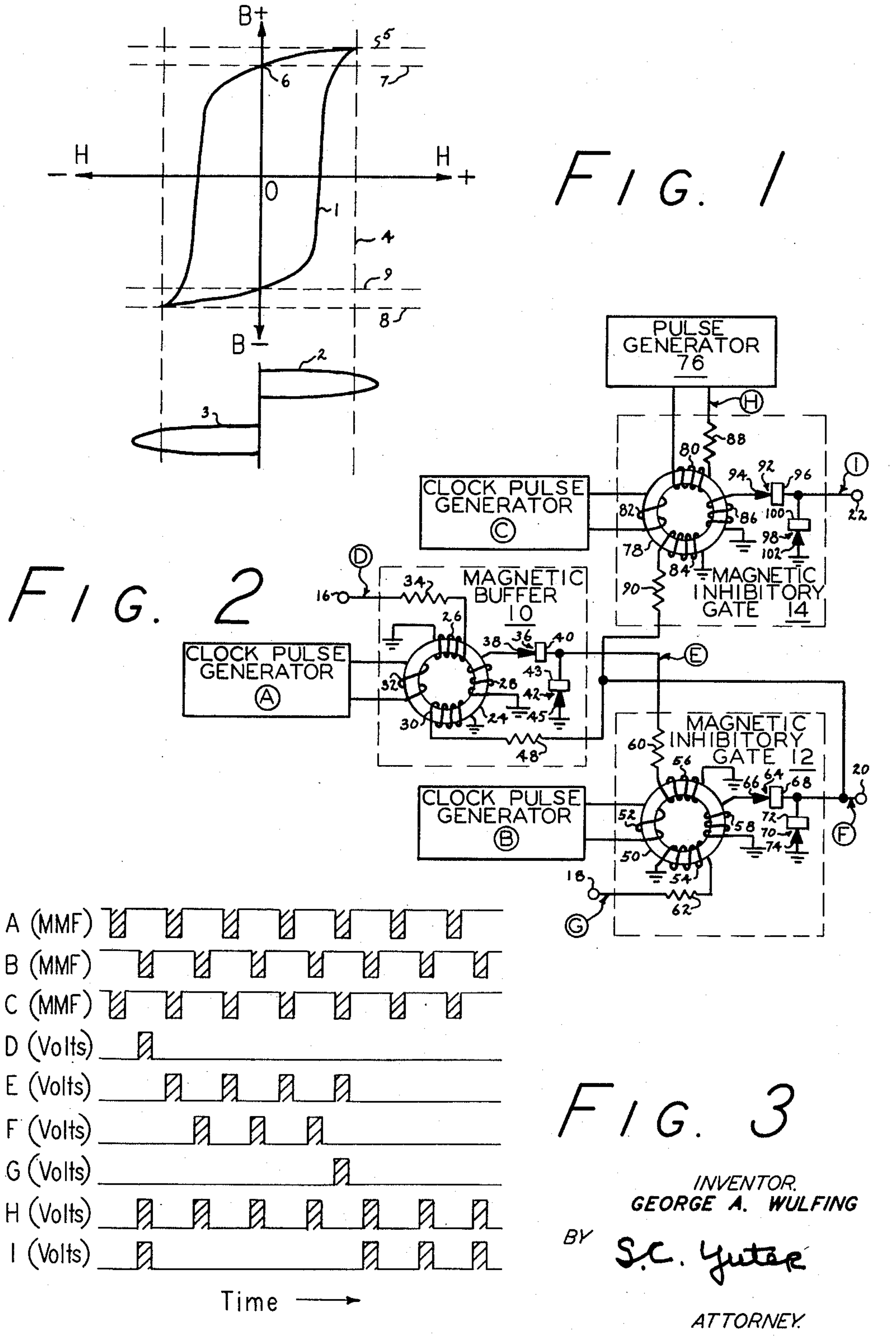
Fig. 1 shows a curve illustrating the hysteresis characteristic of a magnetic core made of preferred material.
Fig. 2 is a schematic drawing of the magnetic flip-flop in accordance with the invention.
Fig. 3 is a time chart which illustrates the performance of the magnetic flip-flop shown in Fig. 2.

Referring now to Fig. 1, a substantially rectangular hysteresis loop 1 is shown for a toroidal core, for example, core 24 of Fig. 2. This core may be made from one of the nickel-iron alloys which are subjected to special processes of heat and magnetic treatment to provide the desired characteristics.

On the curve, shown in Fig. 1, both the magnetomotive force (magnetizing force) H, and the flux density (density of magnetic lines of force) B, are characteristically shown as having two possible directions, positive or negative, which represent clockwise and counterclockwise directions in the toroidal core. Directly below the hysteresis loop 1 are shown a positive surge 2 and a negative surge 3 of magnetomotive force which might respectively result from positive and negative current pulses through given windings on the core.

When a surge of magnetomotive force such as the positive surge 2 exceeds the magnitude indicated by the ordinate 4, the core is driven to positive flux saturation as illustrated (idealized) by the abscissa 5. When the positive surge 2 thereafter relaxes to zero magnetomotive force, the flux density B in the core does not return to zero but returns instead to the point 6 on the abscissa 7 due to the retentivity of the core. The "residual" flux thus continues to exist in the positive direction.

It will be noted that the loss in flux density B represented by the difference between the abscissae 5 and 7 is relatively small. Hence, the residual magnetism (point 0 to point 6) is a high percentage of the magnetism at core saturation.

Additional positive surges of magnetomotive force will function only to change the flux density levels in the core between the abscissae 5 and 7. However, if a magnetomotive surge such as the negative surge 3 occurs, the direction of the flux in the core reverses (or "flips") and the core is brought to negative saturation as illustrated by the abscissa 8. Thereafter, the core will relax to the flux density shown by abscissa 9 and the flux will maintain its negative direction until the core is once again driven to positive flux saturation by a positive magnetomotive surge of sufficient magnitude.

Thus, a magnetomotive force of any magnitude applied in the same direction as the existing residual flux has little effect on the core whereas a magnetomotive force of requisite magnitude applied in the opposite direction results in a large flux change and causes the residual-flux direction to be flipped to the opposite direction.

Referring now to the magnetic bi-stable device shown in Fig. 2, one embodiment of a magnetic flip-flop in accordance with the invention is shown in which the characteristics of rectangular hysteresis-loop materials are utilized.

The basic portion of the magnetic flip-flop comprises the magnetic buffer 10, the magnetic inhibitory gate 12, the set terminal 16, the reset terminal 18 and the output terminal 20.

The magnetic flip-flop is set (caused to change from its unexcited state to its excited state) and transmits a series of pulses from the output terminal 20 when an appropriate signal is received via the set terminal 16. The magnetic flip-flop is thereafter reset (caused to change from its excited state to its unexcited state) when an appropriate pulse is received via the reset terminal 18. In its normal or reset state, the magnetic flip-flop transmits no pulses from its output terminal 20.

More particularly, a pulse which may occur during certain predetermined time periods is received via the set terminal 16 to initiate a cycle of operation. This pulse is fed to the magnetic buffer 10. The magnetic buffer 10 comprises the core 24 which has rectangular hysteresis-loop characteristics, the windings 26, 28, 30 and 32, the resistor 34, and the crystal diodes 36 and 42. The crystal diodes 36 and 42 may be replaced by suitable rectifiers of any type.

The winding 26 is coupled at one end via the resistor 34 to the set terminal 16 and at the other end to ground. The resistance of the resistor 34 is large compared to the impedance of the winding 26. Therefore, the total impedance offered to a signal by the circuit of the winding 26 is substantially independent of the impedance of the winding 26 whose impedance may vary with changes of flux density in the core 24. Therefore, the current in the winding 26 is maintained substantially constant during the receipt of a signal of constant magnitude. The resistor 34 is unnecessary if a constant current source is chosen to feed signals to the set terminal 16.

The winding 30 is coupled at one end to the magnetic inhibitory gate 12 and at the other end to ground. The windings 26 and 30 are wound on the core 24 in a manner such that when a positive pulse of appropriate magnitude is received, respectively, from either the set terminal 16 or the magnetic inhibitory gate 12, the core 24 is positively saturated with flux.

The winding 28 is connected at one end to the anode 38 of the crystal diode 36, whose cathode 40 is coupled to the magnetic inhibitory gate 12, and at the other end to ground. The winding 28 functions to react to changes of flux in the core 24 in accordance with the rate of change of flux to produce output signals.

When the core 24 is flipped to positive saturation by a set pulse received via the set terminal 16, the winding 28 reacts by virtue of the direction of its winding to produce a negative pulse. The crystal diode 36, however, is so poled as to prevent this negative pulse from being transmitted to the magnetic inhibitory gate 12. Thus, no immediate result is realized from the flipping of the core 24 to positive saturation.

However, a positive pulse in the winding 28 is produced due to the function of the winding 32 which is fed a continuous series of pulses by the clock pulse generator A. The pulses generated by the clock pulse generator A are phased to occur a predetermined amount of time after the time at which a set pulse should occur in the winding 26. The winding 32 provides sufficient negative magnetomotive force to cause the core 24 to be flipped from its positive residual flux condition to a negative flux saturation condition thus causing a positive pulse to be generated in the winding 28. This positive pulse is transmitted via the crystal diode 36 to the magnetic inhibitory gate 12.

The crystal diode 42, which may be replaced by any suitable rectifier, has its cathode 43 connected to the crystal diode 36 and its anode 45 connected to ground. The crystal diodes 36 and 42 function to prevent negative pulses from the magnetic inhibitory gate 12 from being fed back to the winding 28.

It is thus seen that the magnetic buffer 10 responds to a set pulse by transmitting a positive pulse to the magnetic inhibitory gate 12 after a certain period of delay. This period is equal in time to the period elapsing between the positive flipping which results from a set pulse and the negative flipping caused by a clock pulse fed to the winding 32.

The clock pulse generator A which feeds the winding 32 may be one of the square-wave pulse generators well known to those skilled in the art. Clock pulse shapes other than square-wave may also be used. The advantage of using a clock pulse generator inheres in its independence from the circuitry in conjunction with which the magnetic flip-flop is used, thereby permitting output signals to be generated by the magnetic buffer 10 at times which are relatively independent of time deviations in the set pulses and which are hence relatively precise.

The magnetic inhibitory gate 12 which in this circuit receives the signal generated by the magnetic buffer 10, comprises the core 50 which is made of a material having rectangular hysteresis-loop characteristics, the windings 52, 54, 56 and 58, the resistors 60 and 62, and the crystal diodes 64 and 70. The magnetic inhibitory gate 12 also receives signals via the reset terminal 18.

The winding 52 is fed by the clock pulse generator B which generates a series of clock pulses of constant frequency. These clock pulses may be square-wave pulses and the clock pulse generator may be any of the types well known to those skilled in the art. The clock pulses are phased so as to occur a predetermined time after the time at which a pulse could be received by the magnetic inhibitory gate 12 from the magnetic buffer 10.

The winding 52, as a result of the clock pulses, functions to produce a negative flux direction in the core 50. Hence, since the clock pulses are normally the only pulses received by the magnetic inhibitory gate 12, the normal flux direction in the core 50 is negative.

The winding 54 is coupled at one end to ground and at the other end via the resistor 62 to the reset terminal 18. The resistor 62 functions similarly to the resistor 34 and maintains a substantially constant current through the winding 54 during the occurrence of a signal. The resistor 62 is unnecessary if the reset terminal 18 is coupled to a constant current source.

Normally, a signal is absent at the reset terminal 18 so that the winding 54 is passive. However, if a signal is fed to the reset terminal 18, the winding 54 generates sufficient negative magnetomotive force to prevent the flux direction in the core 50 from becoming positive due to a magnetomotive force in the winding 56.

The winding 56 is connected at one end to ground and at the other end via the resistor 60 to the magnetic buffer 10. The resistor 60 functions similarly to the resistor 34 and causes the current in the winding 56 to be substantially independent of the impedance of the winding 56 during the receipt of a signal from the magnetic buffer 10.

When the winding 56 receives a positive pulse from the magnetic buffer 10, sufficient positive magnetomotive force is produced (provided the winding 54 is passive) to saturate the core 50 with flux in the positive direction. When this magnetomotive force relaxes, the flux density in the core 50 remains positively directioned and is a large percentage of the saturation value. The change of the flux in the core 50 from its normal negative direction to the positive direction as a result of the pulse in the winding 56 generates a negative pulse in the winding 58.

The winding 58 is connected at one end to ground and at the other end to the anode 66 of the crystal diode 64. The cathode 68 of the crystal diode 64 is connected to the output terminal 20. Due to the rectifying action of the crystal diode 64 (which may be replaced by any suitable rectifier), the negative pulse is blocked and no immediate result is realized by the change of the flux direction in the core 50 from negative to positive.

However, when the next sequential clock pulse occurs in the winding 52, the resulting magnetomotive force changes the flux direction in the core 50 from the existing positive direction back to the negative direction. This change of flux direction causes a positive pulse to be generated in the winding 58. The crystal diode 64 permits the postitive pulse to be transmitted to the output terminal 20 as an output pulse.

It will also be noted that the crystal diode 64 is coupled to the cathode 72 of the crystal diode 70 whose anode 74 is connected to ground. The combined functions of the crystal diodes 64 and 70 prevent signals from being fed back into the winding 58.

The cathode 68 of the crystal diode 64 is also coupled via the resistor 48 to the winding 30 of the magnetic buffer 10. The resistor 48 functions similarly to the resistor 34 to cause the current in the winding 30 to be substantially independent of the impedance of the winding 30 during the occurrence of a signal.

The resistor 48 also functions as a regenerative feedback path so that the positive pulse which is fed to the output terminal 20 is also fed back to the magnetic buffer 10.

It will be recalled that the flux in the core 24 of the magnetic buffer 10 resides in the negative direction due to the clock pulses in the winding 32. The direction of the turns of the winding 30 is such that when a positive pulse is received from the magnetic inhibitory gate 12, the flux direction in the core 24 is again made positive. One cycle of operation has thus been completed and the next cycle automatically begun.

In this manner, the magnetic flip-flop responds to a signal received at the set terminal 16 by performing a series of cycles of operation and generating an associated series of pulses which are transmitted from the output terminal 20. The series of pulses may be terminated, as previously shown, by the introduction of an appropriate signal to the reset terminal 18.

Thus, the portion of the circuit thus far disclosed constitutes a bi-stable device which transmits a series of pulses indicative of one stable state and which, during the second stable state, is passive.

The output terminal 22 functions as an inverse output terminal since, although the circuit as described constitutes an independent and complete magnetic flip-flop, it is sometimes desirable to provide an additional output signal whose indications are directly opposite to the normal output signal of the bi-stable device. Thus, the requirement for the output terminal 22 is that it provide a series of pulses when the output terminal 20 does not and that it be passive when the output terminal 20 is transmitting pulses.

The signal which appears at the output terminal 22 is a result of the operation of the magnetic inhibitory gate 14 which comprises the core 78, the windings 80, 82, 84 and 86, the resistors 88 and 90, and the crystal diodes 92 and 98. The magnetic inhibitory gate 14 receives signals from the magnetic inhibitory gate 12, the pulse generator 76, and the clock pulse generator C.

The magnetic inhibitory gate 12 transmits any positive signal which it may generate to the winding 84 via the resistor 90. The resistor 90 maintains a constant current in the winding 84 by operating in a manner similar to that of the resistor 34. The winding 84 is the inhibiting winding of the magnetic inhibitory gate 14 and is connected between the resistor 90 and ground.

The winding direction and the number of turns of the winding 84 is such that, when a positive pulse is received from the magnetic inhibitory gate 12, sufficient negative magnetomotive force is generated to drive the core 78 to negative-direction flux saturation and to maintain the core 78 in this condition for the duration of the positive pulse despite the effects of any of the other associated windings, and in particular the effect of the winding 80. The winding 84 controls the magnetic inhibitory gate 14 so that it generates a series of pulses only while the magnetic flip-flop is in its unexcited state.

The pulse generator 76 may be a square-wave or trapezoidal pulse generator of known type and transmits its signals via the resistor 88 to the winding 80. The resistor 88 functions similarly to the resistor 34 and maintains a substantially constant current in the winding 80 for the duration of a received signal. The resistor 88 is unnecessary if the pulse generator 76 is a constant current source.

The pulse generator 76 generates pulses at a frequency equal to the frequency at which the magnetic inhibitory gate 12 can produce pulses. The pulses generated by the pulse generator 76 are in phase with the pulses received from the magnetic inhibitory gate 12.

The pulses which are transmitted to the winding 80 cause the core 78 to become positively saturated with flux and to reside at a high positive-direction flux density only if pulses are not being received in the winding 84 from the magnetic inhibitory gate 12. Thus, only when the magnetic flip-flop is in its excited state, is the core 78 prevented from being saturated with positive-direction flux.

The clock pulses transmitted from the clock pulse generator C to the winding 82 are phased so as to lag by a predetermined period of time the pulses generated by the pulse generator 76. These clock pulses, by virtue of the winding direction and the number of turns of the winding 82, cause the flux in the core 78 to revert to the negative direction.

The winding 86 responds to the change of flux direction from negative to positive (as distinguished from the windings 28 and 58) to generate a positive voltage pulse. The crystal diode 92 whose anode 94 is coupled to the winding 86 and whose cathode 96 is coupled to the output terminal 22 permits only positive pulses to pass to the output terminal 22. Thus, when the magnetic flip-flop is in its unexcited state, pulses are transmitted from the output terminal 22.

The crystal diode 98, which comprises the anode 102 and the cathode 100, couples the output terminal 22 to ground. The anode 102 is connected to ground and the cathode 100 is connected to the output terminal 22. The crystal diode 98 operates with the crystal diode 92 to prevent signals from passing from the output terminal 22 to the winding 86.

Thus, the described circuit constitutes a bi-stable device which has two stable-state indicators whose indications are interchanged to denote a change in the stable state of the circuit.

Referring now to Fig. 3, a time chart is shown to illustrate a sequence of operations which would occur following the receipt of a set pulse by the magnetic flip-flop.

Idealized pulse forms having a twenty-five percent duty cycle are used in the chart. Other types of pulses can be used, but for the purpose of the time chart, the precise shape of each pulse is unimportant.

It is also to be noted that certain of the signals are charted as voltages while others are charted as magnetomotive forces (mmf.) for purposes of clarity. Each line of the chart is indicative of the signal which occurs in or as a result of a different part of the circuit as alphabetically designated in Fig. 2.

The magnetomotive forces in the cores associated with the clock pulse generators A, B and C are illustrated on lines A, B and C of Fig. 3. It is due to these magnetomotive surges that the associated cores are normally maintained in a condition of negative direction magnetism. It will be noted that the magnetomotive forces illustrated in lines A and C are of the same phasing thus indicating the possibility of using one clock pulse generator for performing dual functions.

Line D illustrates the occurrence of a set pulse which is fed to the magnetic buffer 10 via the set terminal 16. Upon the next occurrence of a surge of magnetomotive force as seen on line A, the magnetic buffer 10 generates a positive pulse as illustrated on line E. The generation of this latter positive pulse conditions the magnetic inhibitory gate 12 so that the next negative surge of magnetomotive force illustrated on line B causes the magnetic inhibitory gate 12 to produce the first positive pulse as shown on line F.

In the described embodiment of the invention, the pulses illustrated on line F represent the primary output signal of the magnetic flip-flop.

The generation of the first pulse on line F reconditions the magnetic buffer 10 so that the next negative surge of magnetomotive force illustrated on line A causes the magnetic buffer 10 to again generate a positive pulse as illustrated by the second pulse on line E.

The alternate generation of pulses by the magnetic buffer 10 and the magnetic inhibitory gate 12 is continued until a reset pulse is transmitted to the magnetic flip-flop via the rest terminal 18. This pulse is timed to coincide with one of the pulses generated by the magnetic buffer 10 and is illustrated on line G. This reset pulse prevents the next pulse generated by the magnetic buffer 10 from conditioning the magnetic inhibitory gate 12 and thus terminates the periodic generation of pulses by both the magnetic inhibitory gate 12 and the magnetic buffer 10.

As the magnetic flip-flop proceeds through the aforementioned steps, pulses are being fed from the pulse generator 76 to the magnetic inhibitory gate 14. These pulses are shown on line H as having the same frequency as the clock pulses which cause the magnetomotive force surges shown on line C.

The pulses shown on line H cause the magnetic inhibitory gate 14 to generate the pulses shown on line I.

When, however, the magnetic inhibitory gate 12 generates the pulses illustrated on line F, the generation of the pulses on line I by the magnetic inhibitory gate 14 is inhibited and is not again resumed until the termination of the generation of pulses by the magnetic inhibitory gate 12. Thereafter the next successive pulse on line H causes the magnetic inhibitory gate 14 to generate another positive pulse. The generation of positive pulses by the magnetic inhibitory gate 14 will then continue until a new series of pulses is generated by the magnetic inhibitory gate 12. The pulses illustrated on line I are illustrative of the output signal transmitted from the output terminal 22.

It is thus seen that the receipt of a set pulse via the set terminal 16 initiates the transmission of a series of pulses from the output terminal 20 and causes the concomitant termination of the series of pulses at the output terminal 22, whereas a reset pulse received via the reset terminal 18 terminates the transmission of pulses from the output terminal 20 and initiates the generation of a series of pulses at the output terminal 22.

Therefore, in accordance with the invention the number of cores required to provide a magnetic bi-stable device is minimized. It should be noted that only two cores are required for the basic magnetic flip-flop, and that only one additional core is required to provide an inverse output signal. It should be further noted that the receipt of an externally generated signal by a single magnetic core is sufficient to establish a stable state.

There will be obvious to those skilled in the art many modifications and variations utilizing the principles set forth and realizing many or all of the objects and features of the circuits described but which do not depart essentially from the spirit of the invention.

What is claimed is:

1. A bi-stable device responsive to electrical signals for performing a series of cycles of operation, said bi-stable device comprising first, second, and third means each including a single magnetic core with associated windings, said first means responsive to certain of the electrical signals for initiating a cycle of operation, said second means responsive to said first means for terminating the cycle of operation, said second means being regeneratively coupled to said first means for initiating successive cycles of operation to form a series of cycles of operation, said second means being responsive to other of the electrical signals for terminating the series of cycles of operation, said third means being normally operative to generate a signal and responsive to said second means to become inoperative during said series of cycles of operation.

2. A bi-stable device responsive to electrical signals for performing a series of cycles of operation, said bi-stable device comprising first, second, and third means each including a single magnetic core with associated windings, said first means responsive to certain of the electrical signals for initiating a cycle of operation, said second means responsive to said first means for terminating the cycle of operation, said second means being regeneratively coupled to said first means for initiating successive cycles of operation to form a series of cycles of operation, said second means being responsive to other of the electrical signals for terminating the series of cycles of operation, said third means being normally operative to generate a continuous series of signals and including means responsive to said second means to prevent generation of one signal of said series of signals at each initiation of a cycle of operation by said second means.

3. A bi-stable device responsive to discrete and continuous electrical signals comprising a first means having a single magnetic core, certain of the discrete electrical signals being effective for placing said first means in a given magnetic condition and initiating a cycle of operation, said first means being responsive to certain of the continuous electrical signals for placing said first means in an opposite magnetic condition, a second means having a single magnetic core, a predetermined change in magnetic condition of said first means being effective for placing said second means in a given magnetic condition, said second means being responsive to other of the continuous electrical signals for placing said second means in an opposite magnetic condition and thereby producing an output signal and completing the cycle of operation, said first means being responsive to a predetermined change in the magnetic condition of said second means for placing said first means in the given magnetic condition whereby the cycle of operation is repeated, said bi-stable device thereby producing a series of output signals, said second means being responsive to certain of the discrete electrical signals for terminating the series of output signals, and a third means for producing a series of output signals and responsive to said predetermined change in said second means to suppress the production of output signals.

4. A bi-stable device responsive to electrical signals comprising a first means having a single magnetic core, certain of the electrical signals being effective for placing said first means in a given magnetic condition and initiating a cycle of operation, said first means being responsive to other of the electrical signals for placing said first means in an opposite magnetic condition, a second means having a single magnetic core, a predetermined change in magnetic condition of said first means being effective for placing said second means in a given magnetic condition, said second means being responsive to other of the electrical signals for placing said second means in an opposite magnetic condition and thereby producing an output signal and completing the cyclue of operation, said first means being responsive to a predetermined change in the magnetic condition of said second means for placing said first means in the given magnetic condition whereby the cycle of operation is repeated, said bi-stable device thereby producing a series of output signals, said second means being responsive to other of the electrical signals for terminating the series of output signals, and a third means for producing a series of output signals and responsive to said predetermined change in magnetic condition of said second means for suppressing the production of output signals.

5. A bi-stable device responsive to discrete and continuous electrical signals comprising a first means having a single magnetic core with rectangular hysteresis-loop characteristics, certain of the discrete electrical signals being effective for placing said first means in a given magnetic condition and initiating a cycle of operation, said first means being responsive to certain of the continuous electrical signals for placing said first means in an opposite magnetic condition, a second means having a single magnetic core with rectangular hysteresis-loop characteristics, a predetermined change in magnetic condition of said first means being effective for placing said second means in a given magnetic condition, said second means being responsive to other of the continuous electrical signals for placing said second means in an opposite magnetic condition and thereby producing an output signal and completing the cycle of operation, said first means being responsive to a predetermined change in the magnetic condition of said second means for placing said first means in the given magnetic condition whereby the cycle of operation is repeated, said bi-stable device thereby producing a series of output signals, said second means being responsive to certain of the discrete electrical signals for terminating the series of output signals, and a third means for producing a series of output signals and responsive to each signal of said series of output signals of said second means to suppress the production of one signal of its series of output signals.

6. A bi-stable device responsive to discrete and continuous signals comprising first and second cores having rectangular hysteresis-loop characteristics, said first core being set in a given magnetic condition and initiating a cycle of operation in accordance with certain of the discrete signals, said first core being set in an opposite magnetic condition in accordance with certain of the continuous signals, first means associated with said first core being responsive to the change in the magnetic condition of said first core for generating a first pulse of predetermined polarity, second means associated with said second core being responsive to the first pulse of predetermined polarity for setting said second core in a given magnetic condition, third means associated with said second core being responsive to certain of the continuous signals for setting said second core in an opposite magnetic condition, fourth means associated with said second core being responsive to the change in the magnetic condition of said second core for generating a second pulse of predetermined polarity for terminating a cycle of operation, the second pulse of predetermined polarity being fed back to a fifth means associated with said first core for setting said first core in its given magnetic condition and repeating the cycle of operation, with means associated with said second core being responsive to certain of the discrete signals for preventing further repeating of the cycle of operation, and a magnetic means for producing a third series of pulses, said magnetic means being responsive to each change in said second core from the given magnetic condition to the opposite magnetic condition to suppress the production of one pulse of said third series of pulses.

7. A bi-stable device responsive to discrete and continuous signals comprising first and second cores having rectangular hysteresis-loop characteristics, said first and second cores each having a plurality of windings thereon, said first core being responsive to certain of the discrete signals received by one of said windings for being set in a given magnetic condition and initiating a cycle of operation, said first core being responsive to certain of the continuous signals received by another of said windings for being set in an opposite magnetic condition, a third of said windings of said first core being responsive to the change in said first core from the given magnetic condition to the opposite magnetic condition for generating a first pulse of predetermined polarity, one of said windings of said second core being energized by the first pulse of predetermined polarity for setting said second core in a given magnetic condition, another of said windings of said second core being responsive to certain of the continuous signals for setting said second core in an opposite magnetic condition, a third of said windings of said second core being responsive to the change in said second core from the given magnetic condition to the opposite magnetic condition for generating a second pulse of predetermined polarity to indicate termination of a cycle of operation, said second pulse of predetermined polarity being fed to a fourth winding of said first core for setting said first core in its given magnetic condition and initiating a repeat cycle of operation, a fourth winding of said second core being responsive to certain of the discrete signals for preventing further repeating of the cycle of operation, and a magnetic means for producing a series of pulses, said magnetic means being controlled by each said second pulse of predetermined polarity to suppress production of one pulse of said series.

8. A bi-stable device responsive to electrical signals comprising first and second cores having rectangular hysteresis-loop characteristics, said first and second cores each having a plurality of windings thereon, said first core being set by certain of the electrical signals received by one of said windings in a given magnetic condition to initiate a cycle of operation, said first core set by an electrical signal received by a second of said windings in an opposite magnetic condition, a third of said windings of said first core being energized by the change in said first core from the given magnetic condition to the opposite magnetic condition to generate a first signal, one of said windings of said second core being energized by said first signal for setting said second core in a given magnetic condition, a second of said windings of said second core being responsive to other of the electrical signals to set said second core in an opposite magnetic condition, a third of said windings of said second core being energized by the change in said second core from the given magnetic condition to the opposite magnetic condition to generate a second signal to indicate termination of a cycle of operation, said second signal energizing a fourth of said windings of said first core for setting said first core in its given magnetic condition and initiating a repeat cycle of operation, a fourth winding of said second core being energized by another of the electrical signals for preventing further repeating of the cycle of operation, a magnetic means for producing a series of pulses, and a circuit for applying each said second signal to said magnetic means to suppress a pulse of said series.

9. A bi-stable device responsive to electrical signals said device comprising a first means having a single magnetic core, certain of the electrical signals being effective for placing said first means in a given magnetic condition and initiating a cycle of operation, said first means being responsive to other of the electrical signals for placing said first means in an opposite magnetic condition, and a second means having a single magnetic core, a predetermined change in magnetic condition of said first means being effective for placing said second means in a given magnetic condition, said second means being responsive to other of the electrical signals for placing said second means in an opposite magnetic condition and thereby producing an output signal and completing the cycle of operation, said first means being responsive to a predetermined change in the magnetic condition of said second means for placing said first means in the given magnetic condition whereby the cycle of operation is repeated, said by-stable device thereby producing a series of output signals, said second means being responsive to other of the electrical signals for terminating the series of output signals.

10. A bi-stable device responsive to discrete and continuous electrical signals comprising first and second cores having rectangular hysteresis-loop characteristics, said first core being set in a given magnetic condition and initiating a cycle of operation in accordance with certain of the discrete signals, said first core being set in an opposite magnetic condition in accordance with certain of the continuous signals, first means associated with said first core being responsive to the change in the magnetic condition of said first core for generating a first pulse of predetermined polarity, second means associated with said second core being responsive to the first pulse of predetermined polarity for setting said second core in a given magnetic condition, third means associated with said second core being responsive to certain of the continuous signals for setting said second core in an opposite magnetic condition, fourth means associated with said second core being responsive to the change in the magnetic condition of said second core for generating a second pulse of predetermined polarity for terminating a cycle of operation, the second pulse of predetermined polarity being fed back to a fifth means associated with said first core for setting said first core in its given magnetic condition and repeating the cycle of operation, sixth means associated with said second core being responsive to certain of the discrete signals for preventing further repeating of the cycle of operation.

References Cited in the file of this patent

UNITED STATES PATENTS 2,591,406 Carter ---------------- Apr. 1, 1952